US010686716B2

(12) United States Patent
Holla et al.

(10) Patent No.: US 10,686,716 B2
(45) Date of Patent: Jun. 16, 2020

(54) DYNAMIC PROCESSING OF PACKETS USING MULTIPLE RECEIVE QUEUE FEATURES

(71) Applicant: VMware, Inc., Palo Alto, CA (US)

(72) Inventors: Aditya G. Holla, Palo Alto, CA (US); Rishi Mehta, San Jose, CA (US); Boon Ang, Saratoga, CA (US); Rajeev Nair, Newark, CA (US); Wenyi Jiang, Fremont, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/043,127

(22) Filed: Jul. 23, 2018

(65) Prior Publication Data

US 2020/0028792 A1    Jan. 23, 2020

(51) Int. Cl.
  *H04L 12/863* (2013.01)
  *H04L 12/803* (2013.01)
  *G06F 9/455* (2018.01)

(52) U.S. Cl.
  CPC ...... *H04L 47/6295* (2013.01); *G06F 9/45558* (2013.01); *H04L 47/125* (2013.01); *G06F 2009/45591* (2013.01); *G06F 2009/45595* (2013.01)

(58) Field of Classification Search
  CPC ... H04L 47/781; H04L 47/6295; H04L 47/62; H04L 47/2475; H04L 47/2483; H04L 49/9068; H04L 49/9063; H04L 49/90; H04L 49/30; H04L 49/9047; H04L 43/0888; H04L 45/7453

USPC .......................................................... 370/229
See application file for complete search history.

(56) References Cited

U.S. PATENT DOCUMENTS

| | | | |
|---|---|---|---|
| 7,936,770 B1 * | 5/2011 | Frattura | H04L 49/90 370/351 |
| 2010/0064286 A1 | 3/2010 | Pinter et al. | |
| 2011/0153935 A1 | 6/2011 | Li | |
| 2013/0343399 A1 * | 12/2013 | Kandula | G06F 9/5077 370/412 |
| 2014/0122634 A1 | 5/2014 | Conner et al. | |
| 2014/0254594 A1 | 9/2014 | Gasparakis et al. | |
| 2015/0055456 A1 * | 2/2015 | Agarwal | H04L 49/9047 370/230 |
| 2015/0261556 A1 * | 9/2015 | Jain | G06F 9/45558 718/1 |
| 2017/0005931 A1 | 1/2017 | Mehta et al. | |
| 2017/0187640 A1 * | 6/2017 | Vasudevan | H04L 47/50 |
| 2017/0353391 A1 | 12/2017 | Piecuch | |
| 2018/0159771 A1 | 6/2018 | Malloy et al. | |

(Continued)

*Primary Examiner* — Jeffrey M Rutkowski
*Assistant Examiner* — Sudesh M Patidar
(74) *Attorney, Agent, or Firm* — Adeli LLP

(57) ABSTRACT

Some embodiments provide a method for managing multiple queues of a network interface card (NIC) of a host computer that executes a data compute node (DCN). The method defines first, second, and third subsets of the queues. The first subset of queues is associated with a first feature for processing data messages received by the NIC, the second subset of queues is associated with a second feature, and the third subset is associated with both features. The method receives a request from the DCN to process data messages addressed to the DCN using both the first and second features. The method configures the NIC to direct data messages received for the DCN to a queue that is selected from the third subset of queues.

19 Claims, 5 Drawing Sheets

(56) References Cited

U.S. PATENT DOCUMENTS

2018/0285151 A1 10/2018 Wang et al.
2019/0036894 A1 1/2019 Wang et al.
2019/0281018 A1 9/2019 Zhu et al.

* cited by examiner

DYNAMIC PROCESSING OF PACKETS USING MULTIPLE RECEIVE QUEUE FEATURES

BACKGROUND

For virtual machines executing on a host computer and connected to a network via the hardware of the host computer, data throughput is limited by the rate of data that the virtual machine can receive, and by the CPU time required to process the data. One way the throughput can be increased is by increasing the data rate, for example by using load balancing to leverage multiple hardware receive queues of the network interface card (NIC) at once. Another way to increase throughput is to reduce the CPU time required to process the received data, for example by combining multiple smaller data messages into larger data messages. However, using either of these solutions may be insufficient for machines that require very high throughput.

BRIEF SUMMARY

Some embodiments of the invention provide novel techniques for managing queues of a host computer's physical network interface card (PNIC), in order to increase throughput to data compute nodes (DCNs), such as virtual machines (VMs), that execute on the host computer. Each DCN executes on virtualization software that runs on the host computer and receives data messages (e.g., packets) via a virtual network interface card (VNIC) or VM kernel network interface card (VMKNIC). The PNIC has multiple hardware queues to receive incoming data messages from the network and deliver the received data messages to the virtualization software, which then delivers the data messages to their respective destination DCNs.

The method of some embodiments combines two types of features supported by the PNIC and/or the virtualization software to increase throughput of data messages to the DCNs. The throughput of data messages to each DCN is determined, among other factors, by the rate of data received by each DCN and the CPU time required to process the received data. The first type of feature leverages multiple hardware queues in the PNIC to increase the data rate of received messages. The second type of feature reduces the CPU time required to process the data messages that are received from a single hardware queue. A DCN's VNIC can request either feature or both features simultaneously, depending on the throughput requirements of the DCN. The virtualization software then dynamically configures the PNIC to provide the features, depending on the load on the hardware queues, which is calculated based on CPU load and other data message statistics collected by the PNIC and the virtualization software.

Each DCN is assigned a logical receive queue by the virtualization software in some embodiments. Each logical queue in the virtualization software is backed by at least one hardware receive queue in the PNIC, each of which has a dedicated CPU or CPU core. In some embodiments, the hardware queues in the PNIC include one default queue and a number of non-default queues. By default, the PNIC uses the default queue for incoming data messages. As the load on the default queue increases, a load balancer in the virtualization software configures the PNIC to distribute incoming traffic to the non-default hardware queues. In some embodiments, as the load on default queue decreases (or load on the non-default queues increases), the traffic is redistributed back to the default queue.

Traffic addressed to a DCN is redirected by applying filters to incoming data, where each filter is associated with the DCN's VNIC. For example, a filter could direct all incoming data messages with a destination address associated with the DCN to a single shared hardware queue. In some embodiments the destination address can be based on an outer MAC address of the data message, an inner MAC address of an encapsulated data message, a virtual network ID (VNI), or some combination of these. However, using filters that are based only on destination addresses limits a VNIC to receiving data messages from a single hardware queue, which imposes limits on throughput.

The PNIC may support different types of data processing features to increase throughput by using load-balancing to distribute data messages among multiple hardware queues based on other attributes of the data messages. By applying filters associated with the requesting VNIC to different hardware queues, the VNIC can receive data messages from multiple hardware queues, and thereby leverage multiple CPUs (or cores) for processing. One implementation of this technique, called Receive Side Scaling (RSS), uses additional fields from the packet header used for defining Internet Protocol (IP) flows (e.g., source IP address, source port number, destination IP address, destination port number, and transport layer protocol). Different PNICs may support different implementations of such flow-based load-balancing methods.

When multiple hardware queues are used to deliver data messages to a single DCN, the DCN still perceives a single logical queue in the virtualization software. The single logical queue is thus backed by multiple hardware queues which share the same feature. In some embodiments, several logical queues are grouped into a "pool" of queues that all support the same feature. Logical queues in a pool may be backed by a single hardware queue or backed by multiple hardware queues, depending on the requirements of the supported feature for that pool. Hardware queues may be allocated, de-allocated, and re-allocated to these pools on a dynamic basis in some embodiments, based on the load of the default queue and the load on the hardware queues currently allocated to the pool. A pool can also be created in some embodiments for data messages addressed to VNICs that do not request any features.

In addition to load-balancing, in some embodiments another feature supported by PNICs to increase throughput of data messages to the DCNs is to reduce the CPU time needed to process the data messages. One such feature is to combine multiple associated data messages into a single data message. Therefore, the CPU has fewer data overall messages to process. An example of this type of feature is Large Receive Offload (LRO). The virtualization software can create pools of logical queues to support this feature, and each logical queue will be backed by a single hardware queue. When the VNIC requests such a feature, the PNIC applies a filter associated with the requesting VNIC to direct all data messages to a single queue in the pool associated with the feature. In some embodiments, the PNIC does not support this type of data-reduction feature, and the feature is instead implemented in the virtualization software. Regardless of whether such a feature is implemented in the PNIC or the virtualization software, only a single queue is used.

In some embodiments, the virtualization software creates a first pool for a load-balancing feature (e.g., RSS), a second pool for a data reduction feature (e.g., LRO), and a third pool for both features (e.g., RSS+LRO). The PNIC initially applies filters for each VNIC to the default queue. When a VNIC requests one of the feature types, the virtualization software monitors the load on the default queue, and if the load is higher than a certain threshold, configures the PNIC to move the filter for the requested feature to a queue backing the pool corresponding to that feature. If the load drops below the threshold, the virtualization software configures the PNIC to move the filter back to the default queue.

In some embodiments, when a VNIC requests a combination of both types of features, the virtualization software monitors the load on the default queue, and if the load is higher than a certain threshold, configures the PNIC to move the filter for the requesting VNIC to a queue backing the pool that supports the load-balancing feature. If the load on the queues in that pool rises above another threshold, then the virtualization software configures the PNIC to move the filter to a queue backing the pool that supports both features. As the load on the queues in the pools decreases below different thresholds, the filter is correspondingly moved back to the single-feature pool and then to the default queue.

In some embodiments, if the filter needs to be moved to a pool for a requested feature, but there are no available queues in that pool, the virtualization software may create a new pool for the feature. The new pool may be created by reallocating queues from the other pools, depending on the load on those queues.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Some embodiments of the invention provide novel techniques for managing queues of a host computer's physical network interface card (PNIC), in order to increase throughput to data compute nodes (DCNs), such as virtual machines (VMs), that execute on the host computer. Each DCN executes on virtualization software that runs on the host computer and receives data messages (e.g., packets) via a virtual network interface card (VNIC) or VM kernel network interface card (VMKNIC). The PNIC has multiple hardware queues to receive incoming data messages from a network and deliver the received data messages to the virtualization software, which then delivers the data messages to their respective destination DCNs.

The method of some embodiments combines two types of features supported by the PNIC and/or the virtualization software to increase throughput of data messages to the VMs. The throughput of data messages to each VM is determined, among other factors, by the rate of data received by each VM and the CPU time required to process the received data. The first type of feature leverages multiple hardware queues in the PNIC to increase the data rate of received messages. The second type of feature reduces the CPU time required to process the data messages that are received from a single hardware queue. A VM's VNIC can request either feature or both features simultaneously, depending on the throughput requirements of the VM. The virtualization software then dynamically configures the PNIC to provide the features, depending on the load on the hardware queues, which is calculated based on CPU load and other data message statistics collected by the PNIC and the virtualization software.

As used in this document, the term data packet, packet, data message, or message refers to a collection of bits in a particular format sent across a network. It should be understood that the term data packet, packet, data message, or message may be used herein to refer to various formatted collections of bits that may be sent across a network, such as Ethernet frames, IP packets, TCP segments, UDP datagrams, etc. While the examples below refer to data packets, packets, data messages, or messages, it should be understood that the invention should not be limited to any specific format or type of data message. Further, the term virtual machine (VM) may be used herein to refer to any instance of a data compute node (DCN) that operates in virtualization software, including VMs and containers that execute within VMs. While the examples below refer to virtual machines, it should be understood that the invention should not be limited to any specific type of DCN.

Figure 1:
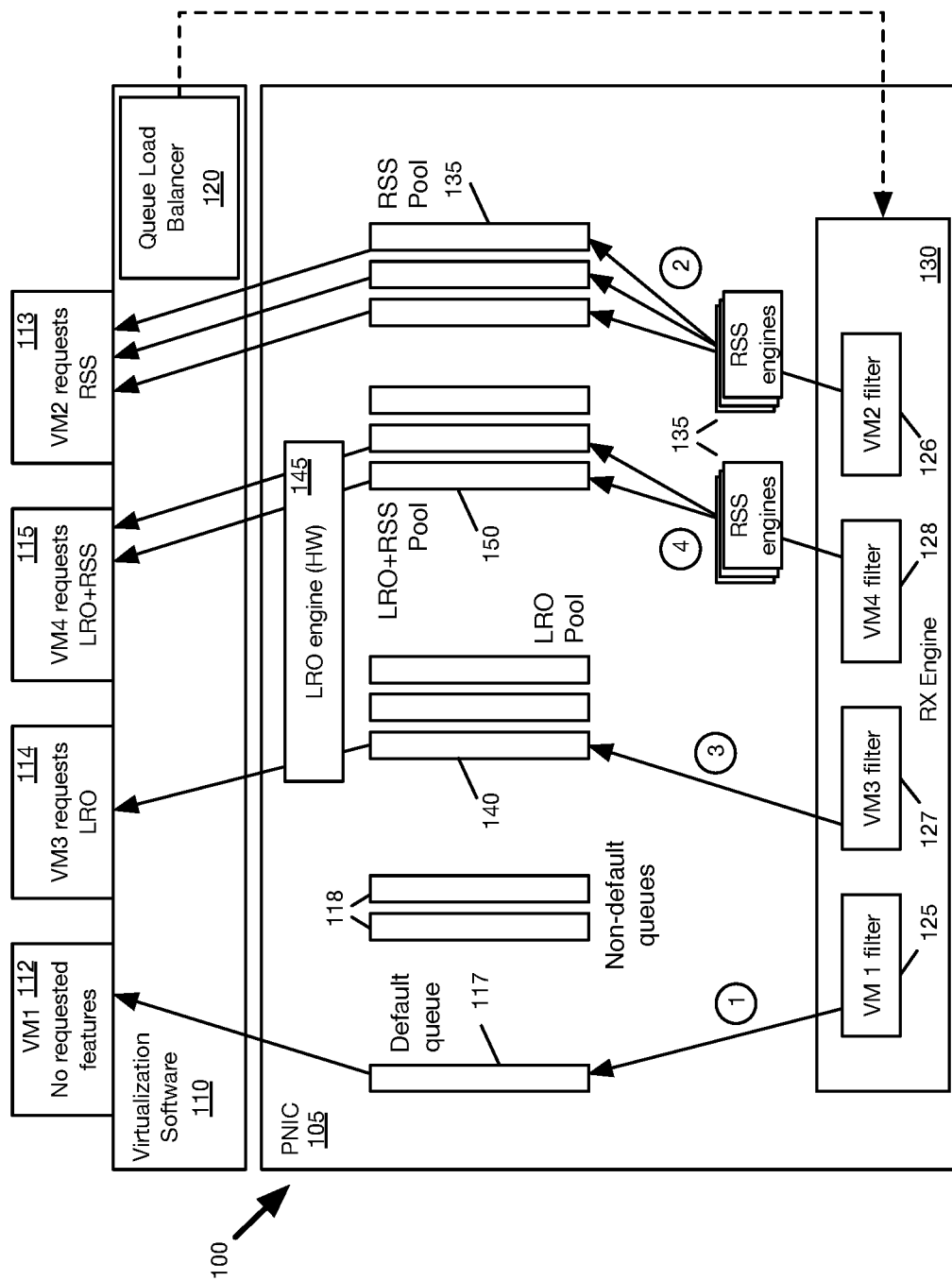
FIG. 1 conceptually illustrates a host computer that includes a PNIC 105 with multiple hardware receive queues.

FIG. 1 conceptually illustrates a host computer 100 that includes a PNIC 105 with multiple hardware receive queues. In addition, the host computer executes virtualization software 110 on top of which multiple virtual machines VM1-VM4 (112-115) operate. In some embodiments, the virtualization software 110 includes both a network virtualization layer to interface with the PNIC and a hypervisor that virtualizes the physical resources of the host machine (e.g., memory, processors, etc.) for the VMs, while in other embodiments these are separate. Each VM has a VNIC or VMKNIC (not shown) to send and receive packets via ports of the virtualization software. It should be understood that the PNIC 105 is a hardware component while the virtualization software 110 and VMs 112-115 are software components that use physical hardware resources of the host computer 100 such as processors and memory.

In some embodiments, the PNIC has one default hardware receive queue 117 and multiple non-default receive queues 118, each of which has a dedicated CPU or CPU core. The PNIC also has corresponding transmit queues that are paired with the receive queues, which are not shown for clarity. As used in this document, "queue" generally refers to receive queues rather than transmit queues, unless otherwise specifically stated.

Each VM is assigned a logical receive queue (not shown) by the virtualization software in some embodiments. Each logical queue in the virtualization software is backed by at least one hardware receive queue in the PNIC 105. Traffic addressed to a VM is assigned to a receive queue by applying filters 125-128 in the receive (RX) engine 130 to incoming data messages, where each filter is associated with a VM's VNIC. In some embodiments, each filter is only associated with one VNIC, but a VNIC may be associated with multiple filters. For example, a filter could direct all incoming data messages with a destination address associated with the VM to a single hardware queue. In some embodiments the destination address can be based on an outer MAC address of the data message, an inner MAC address of an encapsulated data message, a virtual network ID (VNI), or some combination of these.

By default, the PNIC uses the default hardware receive queue for incoming data messages. For example, the encircled number 1 shows the path for a data message addressed to VM1 112. The packet is redirected by VM1's filter 125 and sent to the default queue 117 of the PNIC 105. The virtualization software 110 receives the packet from the default queue 117 and processes it for delivery to VM1 112 (e.g., using a virtual switch operating within the virtualization software). As the load on the default queue increases, a queue load balancer 120 in the virtualization software 110 may configure the RX engine 130 in the PNIC 105 to redistribute incoming traffic from the default queue to one of the non-default hardware queues 118, by modifying the filter 125 accordingly. In some embodiments, as the load on default queue 117 decreases (or load on the non-default queues 118 increases), the traffic assigned to the non-default queues 118 (or some portion of this traffic) is redistributed back to the default queue by the load balancer 120.

In some embodiments, some VMs have high throughput requirements due to the applications or services that they provide. For instance, a VM that is used for streaming video applications might have higher throughput requirements than a web server hosting text-based web pages. To accommodate these requirements, the PNIC 105 may support different types of data processing features to increase throughput, which can be requested by a VM's VNIC. The virtualization software defines "pools" of multiple logical queues in some embodiments, with each pool essentially being a set of queues that share the same set of features. A pool can also be created in some embodiments for VNICs that do not request any features. In some embodiments, these pools are an abstraction within the virtualization software 110, and not visible to the PNIC 105.

Each logical queue in a pool is backed by at least one hardware queue in the PNIC 105, depending on the specifics of the supported feature for that pool. Hardware queues may be allocated, de-allocated, and re-allocated to these pools on a dynamic basis by the queue load balancer 120 in some embodiments, based on the current load of the default queue and the hardware queues currently allocated to the pool. In other words, a given hardware queue in the PNIC 105 backs a logical queue in the virtualization software 110, and a given logical queue is a member of a pool for a single feature (or none). Therefore, the backing hardware queues in the PNIC 105 can also be considered members of the pool, even though the pool concept does not extend to the PNIC.

Using a filter based only on destination addresses limits a VNIC to receiving data messages from a single hardware queue, which imposes limits on throughput. In some embodiments, the PNIC 105 supports a feature to increase throughput by using load-balancing to distribute data messages among multiple hardware queues. By applying filters based on other attributes of the data messages to different hardware queues, the VNIC can receive data messages from multiple hardware queues simultaneously, and thereby leverage multiple CPUs (or cores) for processing. The VM still perceives a single logical queue in the virtualization software, but the logical queue is backed by multiple hardware queues.

An implementation of this technique in some embodiments is Receive Side Scaling (RSS), which uses a 5-tuple of Internet Protocol (IP) packet header fields that define a flow (e.g., source IP address, source port number, destination IP address, destination port number, and transport layer protocol) to assign data messages to individual hardware queues within a group of such queues. For example, the encircled number 2 shows the path for a data message addressed to VM2 113, which requests RSS. The packet is matched by a corresponding filter 126 and redirected to an RSS engine 135. The RSS engine 135 of some embodiments uses a hashing algorithm on the header fields to select one of several available hardware queues 135 backing a particular logical queue in the RSS pool. In some embodiments, the RSS pool may include multiple logical queues, each of which is backed by a different group of hardware queues in the PNIC. Regardless of which hardware queue is selected, the packets are delivered to VM2 113 by the virtualization software 110.

In addition to load-balancing packets across multiple hardware queues, in some embodiments the PNIC 105 supports a feature (or features) to reduce the CPU time needed to process the packets. One such feature, Large Receive Offload (LRO), combines multiple associated smaller packets into a single large packet. Therefore, the CPU has fewer packets overall to process. For example, the encircled number 3 shows the path for a data message addressed to VM3 114, which requests use of the LRO feature. The packet is matched by a corresponding filter 127 and assigned to a hardware queue 140 backing a logical queue in the LRO pool. The packet is then processed by an LRO engine 145, implemented in the PNIC 105 hardware. The LRO engine combines the packet with other packets matching the filter 127 and delivers a combined packet to VM3 114.

A VM that has high throughput requirements therefore can request either type of feature (e.g., LRO or RSS). In some embodiments, a VM can request both features. In addition to creating pools for RSS and for LRO individually, the virtualization software 110 creates a pool for VMs that request both RSS and LRO. The encircled number 4 shows the path of a data message addressed to VM4 115, which requests use of both the RSS and LRO features. The packet is matched by a corresponding filter 128 and redirected to an RSS engine 135, which uses a hashing algorithm on the header fields to select one of several available hardware queues 150 backing a logical queue in the RSS+LRO pool. Regardless of which hardware queue is selected, the packets are delivered to the LRO engine 145, which is implemented in the PNIC 105 hardware. The LRO engine combines the packet with other packets matching the filter 128 and delivers a combined packet to VM4 115. By combining both features, VM4 115 gets the benefit of increased throughput from load balancing across hardware queues (due to RSS) and from reducing CPU processing time (due to LRO).

Figure 2:
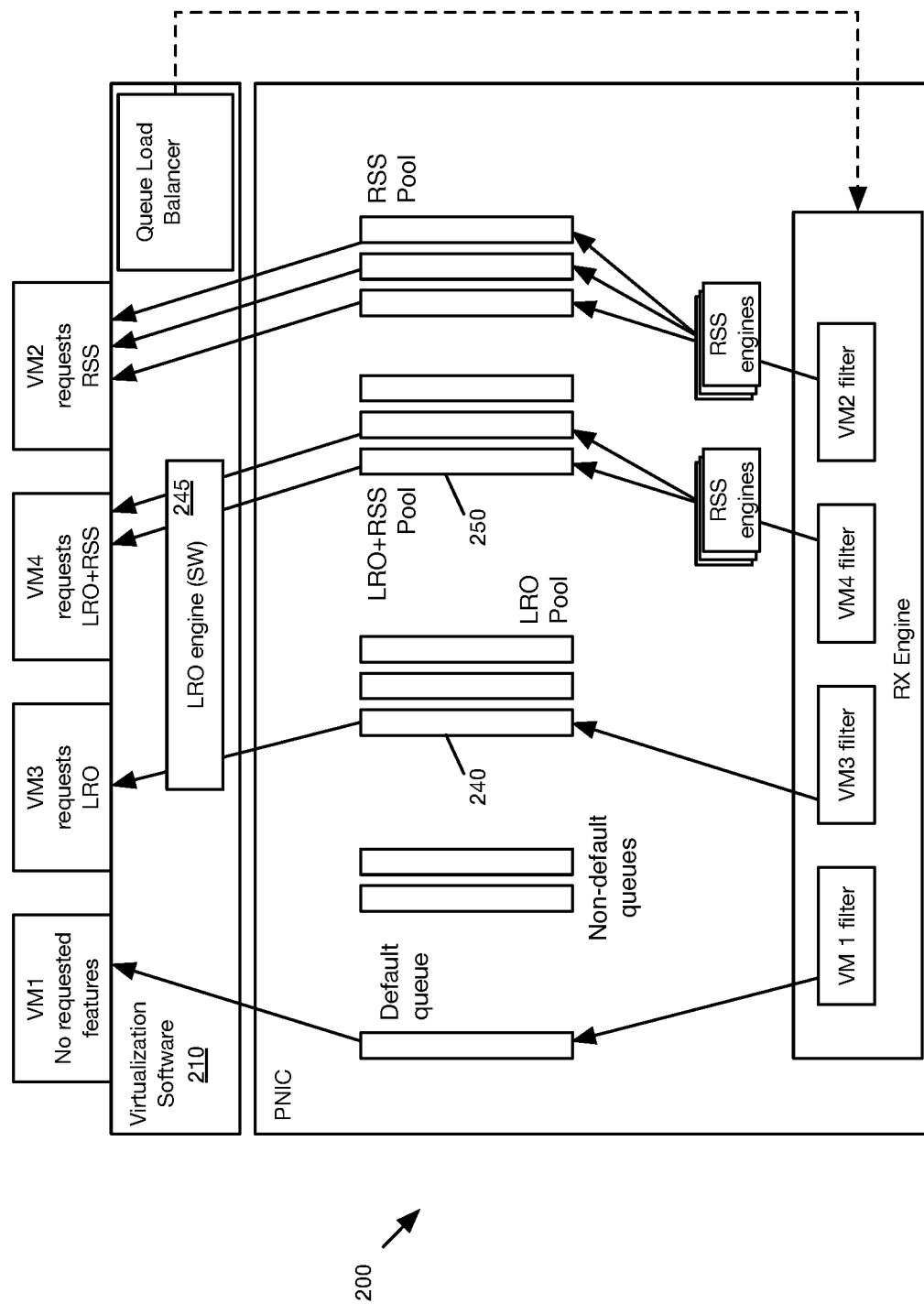
FIG. 2 illustrates an example of a host computer with an LRO engine 245 operating in the virtualization software.

In some embodiments, when the PNIC does not have LRO capability, the virtualization software implements the LRO feature. FIG. 2 illustrates an example of a host computer 200 with an LRO engine 245 operating in the virtualization software 210. In this case, the virtualization software 210 still defines an LRO pool 240 and an LRO/RSS pool 250, and data messages assigned to these queues are processed by the LRO engine 245 in the virtualization software 210.

Packet processing features of the virtualization software of some embodiments will now be described by reference to FIG. 3. Specifically, the virtualization software receives packets from the PNIC and delivers them to the destination VMs, and also receives outgoing packets from the VMs and delivers these to the transmit queues of the PNIC. The virtualization software also includes a queue management system in some embodiments that assigns the queues into pools for supported features, and dynamically adjusts the number of queues in each pool.

Figure 3:
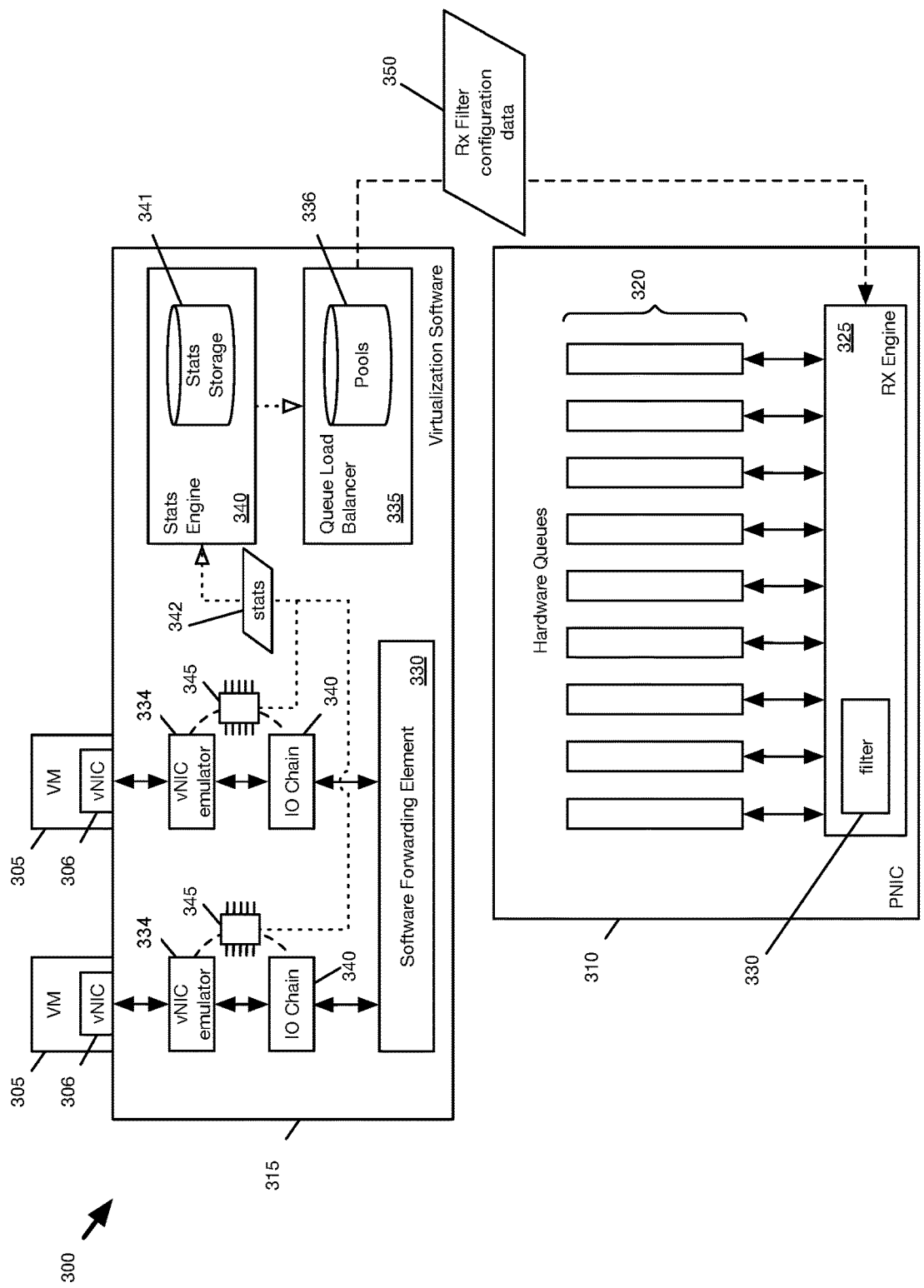
FIG. 3 conceptually illustrates elements of the virtualization software for packet forwarding and processing, and managing pools of queues.

FIG. 3 illustrates (1) multiple VMs 305 that are executing on a host computer 300, (2) the host's physical NIC 310 that is shared by the VMs, and (3) the virtualization software 315 that executes on the host and that facilitates traffic to and from the VMs 305 through the shared PNIC 310. The PNIC 310 has several hardware queues 320 and a receive (RX) engine 325 for receiving incoming packets from a wired or wireless link (not shown). The RX engine 325 implements a filter 330, which is configured to associate a VM's incoming traffic to one of the receive queues 320.

The VMs 305 execute on top of the virtualization software 315 and each VM includes a virtual NIC (VNIC) 306 and/or VMKNIC. The virtualization software 315 also includes (1) a VNIC emulator 334 and IO chain 340 for each VM, (2) a software forwarding element 330, (3) a queue load balancer 335, and (4) a statistics (stats) gathering engine 340. In some embodiments, the VNIC emulator 334 and/or the IO chain 340 functions as a logical queue for processing the received packets addressed to the corresponding VM.

Each IO chain 340, in some embodiments, connects to its corresponding VM through its VNIC emulator 334 and connects to the software forwarding element 330. In some embodiments, the software forwarding element 330 maintains a single port for each VNIC 306, through which it connects to the corresponding IO chain 340. The software forwarding element 330 performs packet-processing operations to forward packets that it receives on one of its ports to another one of its ports. For example, in some embodiments, the software forwarding element 330 uses the data message headers to match a data message to flow based rules, and upon finding a match, performs the action specified by the matching rule. In some embodiments, the software forwarding element 330 also includes a port (not shown) through which it connects to the PNIC 310 to send and receive packets.

The I/O chain 340 includes a series of modules that perform a series of tasks on each packet. As described in U.S. Pat. No. 9,548,965, which is hereby incorporated by reference, two examples of I/O chain modules are ARP and DHCP proxy modules that resolve ARP and DHCP broadcast messages without resorting to broadcasting these messages. Other examples of the processes performed by the modules in the I/O chain include firewall and traffic tunneling operations.

In some embodiments, kernel-level threads 345 manage the VNIC emulator 334 and the modules in the I/O chain 340. These threads also manage (not shown) the PNIC hardware queues 320 that are associated with each corresponding VM. In some embodiments, each thread 345 is executed by one of the cores of a multi-core processor(s) (not shown) of the host computer.

As mentioned above, the virtualization software also includes the statistics (stats) gathering engine 340, the stats storage 341, and the dynamic queue load balancer 335. The stats gathering engine 340, queue load balancer 335 and the threads 345 form part of a queue management system of some embodiments. The statistics 342 that are gathered by the stats gathering engine 340 are used to provide the queue load balancer 335 with the information that it needs to determine which queues to assign to which pools 336 and when to dynamically adjust the number of queues in the pools 336. In some embodiments, these stats 342 include CPU load, PNIC packet rate, PNIC throughput, packet drops, and other information gathered from a variety of sources, including the VNIC emulator 334 and some or all of the modules in the I/O chain 340.

By applying different processes to manage queues in different pools 336, the load balancer 335 can optimize the allocation of queues and the resizing of the pools differently for different pools. The load balancer 335 resizes each pool 336 based on the pool's resource allocation criteria and preempts queues from other pools when necessary. Example of such resource allocation criteria include max/min number of queues of the pool, total CPU utilization of the pool, network traffic of the pool, quality of service (QoS) constraints of the pool, etc. The load balancer 335 also rebalances the queues in the same pool 336 based on the pool's rebalancing criteria. Example of such pool rebalancing criteria include packing VMs on as few queues as possible (e.g., for a high-latency tolerant pool, such as "no feature" pool), distributing the VMs across as many queues as possible (e.g., for a low-latency required pool, such as a pool for LRO or RSS), etc.

In order to rebalance the queues within a pool 336, the load balancer 335 configures the filters of the PNIC 310. In some embodiments, the load balancer 335 sends configuration data 350 to the RX Engine 325, or uses APIs of the PNIC driver, to program the filters 330 and hardware features (e.g. RSS and LRO) for each queue 320. The PNIC initially applies a filter 330 for a VNIC 306 to the default queue. When the VNIC 306 requests one of the feature types, the load balancer 335 monitors the load on the default queue, using the selected stats 342 provided by the stats engine 340. If the load is higher than a certain threshold, load balancer 335 configures the PNIC 310 to move the filter 330 for the requested feature to a queue backing the pool corresponding to that feature. If the load drops below the threshold, the load balancer 335 configures the PNIC to move the filter back to the default queue.

Figure 4:
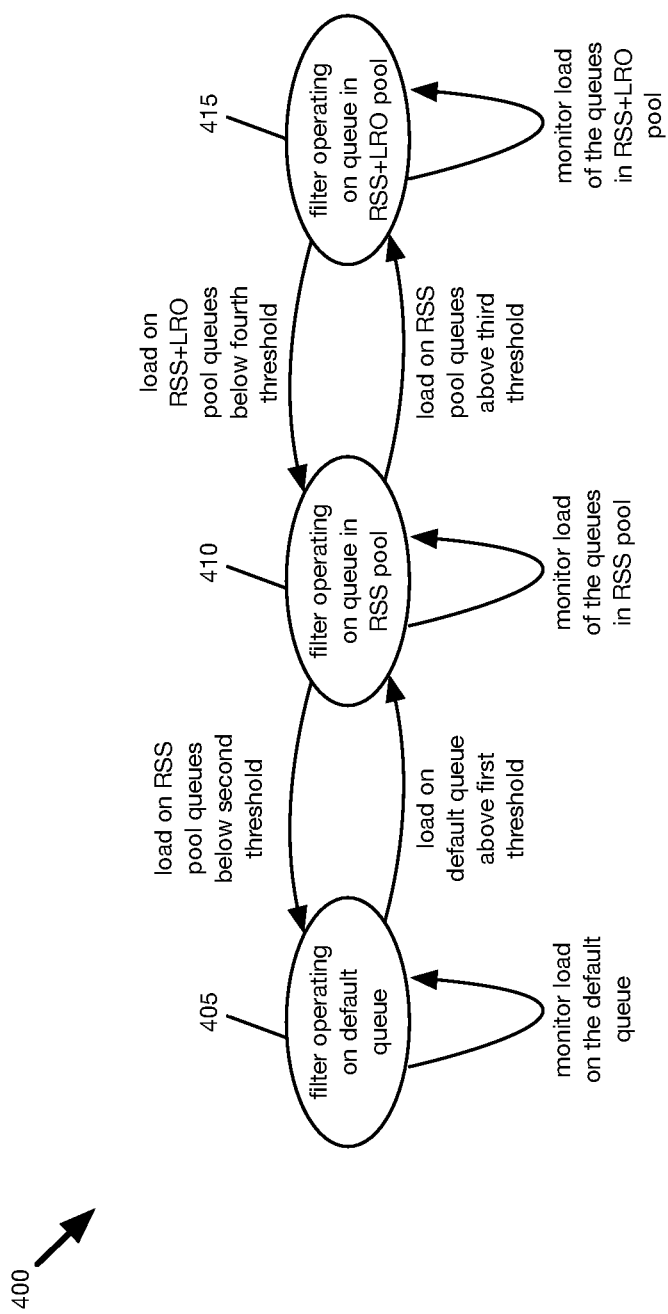
FIG. 4 illustrates a state diagram for the RX engine of some embodiments as the RX engine is configured by the load balancer.

In some embodiments, if a VNIC requests the use of more than one feature (e.g., LRO and RSS), the load balancer 335 attempts to balance the request with the actual load on the queues. FIG. 4 illustrates a state diagram 400 for the RX engine 325 of some embodiments as the RX engine is configured by the load balancer 335. In this case, a VNIC has requested the use of both the RSS and LRO features, and the load balancer 335 monitors the load on the filter for that VM to determine whether to provide one or both of these features for the requesting VNIC. It should be understood that the state diagram 400 only illustrates a small subset of the RX engine 325 specifically pertaining to a particular filter, and that in practice the RX engine would have many other states that are not shown in this figure.

Initially, at state 405, the load balancer 335 configures the RX engine 325 to apply the filter corresponding to the requesting VNIC to the default queue. While in state 405, the load balancer monitors the load on the default queue, where the load is defined by statistics 342 collected by the stats engine 340. The RX engine 325 maintains the filter on the default queue as long as the load is below a first threshold. This threshold can be determined automatically in some embodiments by the load balancer 335 or based on configuration input from an administrator, and is specific to the throughput requirements of the requesting VNIC. In other words, while the filter is assigned to the default queue, the requesting VNIC is receiving sufficient throughput, and therefore does not require the benefit of RSS or LRO. In this manner, the load balancer 335 conserves computing resources for other VNICs.

When the monitored load on the default queue rises above the first threshold, then the load balancer 335 configures the RX engine 325 to assign the filter to a logical queue in the RSS pool. In this state 410, the requesting VNIC is receiving the benefit of increased throughput due to RSS. The load balancer 335 monitors the load on the queues in the RSS pool while in state 410. If the load drops below a second threshold, then the filter is again assigned back to the default queue, and the system returns to state 405. The second threshold is specific to the RSS queue and is not identical to the first threshold in some embodiments (e.g., to avoid flutter if the load were to fluctuate around the first threshold).

When the monitored load on the queues in the RSS pool rises above a third threshold, then the load balancer 335 configures the RX engine 325 to assign the filter to a logical queue in the RSS+LRO pool. In this new state 415, the requesting VNIC is receiving the benefits of both RSS and LRO as requested. The load balancer 335 then monitors the load on the queues in the RSS+LRO pool while in state 415. If the load drops below a fourth threshold, then the filter is again moved back to the RSS pool, and the system returns to state 410. The fourth threshold is specific to the RSS queue and is not identical to the third threshold in some embodiments (again, to avoid flutter).

Figure 5:
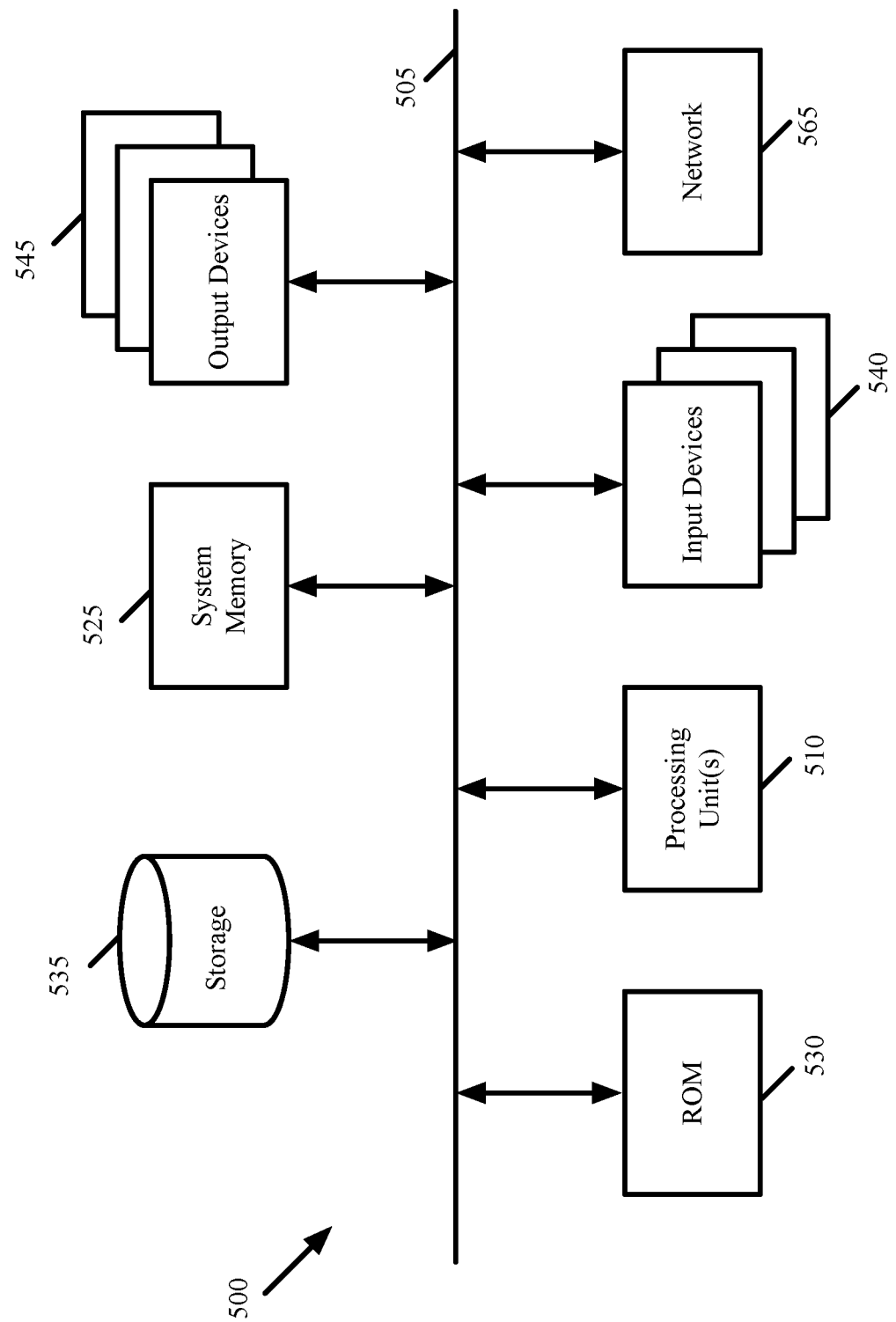
FIG. 5 conceptually illustrates an electronic system with which some embodiments of the invention are implemented.

FIG. 5 conceptually illustrates an electronic system 500 with which some embodiments of the invention are implemented. The electronic system 500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 500 includes a bus 505, processing unit(s) 510, a system memory 525, a read-only memory 530, a permanent storage device 535, input devices 540, and output devices 545.

The bus 505 collectively represents all system, peripheral, and chipset buses that communicatively connect the numerous internal devices of the electronic system 500. For instance, the bus 505 communicatively connects the processing unit(s) 510 with the read-only memory 530, the system memory 525, and the permanent storage device 535.

From these various memory units, the processing unit(s) 510 retrieve instructions to execute and data to process in order to execute the processes of the invention. The processing unit(s) may be a single processor or a multi-core processor in different embodiments.

The read-only-memory (ROM) 530 stores static data and instructions that are needed by the processing unit(s) 510 and other modules of the electronic system. The permanent storage device 535, on the other hand, is a read-and-write memory device. This device is a non-volatile memory unit that stores instructions and data even when the electronic system 500 is off. Some embodiments of the invention use a mass-storage device (such as a magnetic or optical disk and its corresponding disk drive) as the permanent storage device 535.

Other embodiments use a removable storage device (such as a floppy disk, flash drive, etc.) as the permanent storage device. Like the permanent storage device 535, the system memory 525 is a read-and-write memory device. However, unlike storage device 535, the system memory is a volatile read-and-write memory, such as random-access memory. The system memory stores some of the instructions and data that the processor needs at runtime. In some embodiments, the invention's processes are stored in the system memory 525, the permanent storage device 535, and/or the read-only memory 530. From these various memory units, the processing unit(s) 510 retrieve instructions to execute and data to process in order to execute the processes of some embodiments.

The bus 505 also connects to the input and output devices 540 and 545. The input devices enable the user to communicate information and select commands to the electronic system. The input devices 540 include alphanumeric keyboards and pointing devices (also called "cursor control devices"). The output devices 545 display images generated by the electronic system. The output devices include printers and display devices, such as cathode ray tubes (CRT) or liquid crystal displays (LCD). Some embodiments include devices such as a touchscreen that function as both input and output devices.

Finally, bus 505 also couples electronic system 500 to a network 565 through a network adapter (not shown). In this manner, the computer can be a part of a network of computers (such as a local area network ("LAN"), a wide area network ("WAN"), or an Intranet, or a network of networks, such as the Internet. Any or all components of electronic system 500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DNCs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system isolates the containers for different tenants and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESX hypervisor of VMware Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, at least one figure conceptually illustrates a process. The specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for managing a plurality of queues of a network interface card (NIC) of a host computer, the method comprising:

defining first, second, and third subsets of the queues, wherein the first subset of queues is associated with a first feature for aggregating multiple related data messages received by the NIC into a single data message, the second subset of queues is associated with a second feature for load balancing data messages received by the NIC across multiple queues of the associated subset of queues, and the third subset of queues is associated with both the first and second features;

receiving a request from a data compute node (DCN) executing on the host computer for data messages addressed to the DCN to be processed with both the first feature for aggregating multiple related data messages into a single data message and second feature for load balancing data messages across multiple queues; and configuring the NIC to direct data messages received for the DCN to a particular queue selected from the third subset of queues.

2. The method of claim 1 further comprising, upon receiving the request from the DCN, initially configuring the NIC to direct data messages received for the DCN to a default queue that is not in any of the first, second, and third subsets of queues.

3. The method of claim 2, wherein configuring the MC to direct data messages received for the DCN to the particular queue comprises:

monitoring a load on the default queue; and when the load on the default queue exceeds a first threshold, configuring the NIC to direct subsequent data messages received for the DCN to the particular queue.

4. The method of claim 2, wherein the particular queue is a first queue, wherein configuring the NIC to direct data messages received for the DCN to the first queue comprises:

monitoring loads on the default queue and the queues of the first, second, and third subsets;

when the load on the default queue exceeds a first threshold, configuring the NIC to direct subsequent data messages received for the DCN to a second queue in the first subset of queues; and when the load on the second queue exceeds a second threshold, configuring the NIC to direct subsequent data messages received for the DCN to the first queue.

5. The method of claim 1, wherein configuring the NIC to direct the data messages to the particular queue comprises defining a filter for the DCN and configuring the NIC to apply the filter to the particular queue.

6. The method of claim 5, wherein data messages received by the NIC match the filter based on at least one of an outer destination address, an inner destination address, and a network identifier.

7. The method of claim 1, wherein the NIC implements the first feature for aggregating multiple related data messages received by the NIC into a single data message and the second feature for load balancing data messages received by the NIC across multiple queues of the associated subset of queues.

8. The method of claim 1, wherein virtualization software of the host computer implements the first feature for aggregating multiple related data messages received by the NIC into a single data message and the NIC implements the second feature for load balancing data messages received by the NIC across multiple queues of the associated subset of queues.

9. The method of claim 1, wherein:

the second subset of queues are logical queues;

each logical queue in the second subset of queues is associated with a plurality of hardware queues; and the second feature balances data message traffic for a single DCN across multiple hardware queues.

10. The method of claim 1, wherein if there are no queues for a requested feature available, a new subset of queues is defined for the requested feature.

11. The method of claim 10, wherein queues in the new subset are reallocated from at least one existing subset of queues.

12. A non-transitory machine readable medium storing a program which when executed on set of processing units of a host computer manages a plurality of queues of a network interface card (NIC) of the host computer, the program comprising sets of instructions for: defining first, second, and third subsets of the queues, wherein the first subset of queues is associated with a first feature for aggregating multiple related data messages received by the NIC into a single data message, the second subset of queues is associated with a second feature for load balancing data messages received by the NIC across multiple queues of the associated subset of queues, and the third subset of queues is associated with both the first and second features;

receiving a request from a data compute node (DCN) executing on the host computer for data messages addressed to the DCN to be processed with both the first feature for aggregating multiple related data messages into a single data message and second feature for load balancing data messages across multiple queues; and configuring the NIC to direct data messages received for the DCN to a particular queue selected from the third subset of queues.

13. The non-transitory machine readable medium of claim 12, wherein the program further comprises a set of instructions for initially configuring the NIC, upon receiving the request from the DCN, to direct data messages received for the DCN to a default queue that is not in any of the first, second, and third subsets of queues.

14. The non-transitory machine readable medium of claim 13, wherein the set of instructions for configuring the NIC to direct data messages received for the DCN to the particular queue comprises a set of instructions for:

monitoring a load on the default queue; and when the load on the default queue exceeds a first threshold, configuring the NIC to direct subsequent data messages received for the DCN to the particular queue.

15. The non-transitory machine readable medium of claim 13, wherein the particular queue is a first queue, wherein the set of instructions for configuring the NIC to direct data messages received for the DCN to the first queue comprises sets of instructions for:

monitoring loads on the default queue and the queues of the first, second, and third subsets;

when the load on the default queue exceeds a first threshold, configuring the NIC to direct subsequent data messages received for the DCN to a second queue in the first subset of queues; and when the load on the second queue exceeds a second threshold, configuring the NIC to direct subsequent data messages received for the DCN to the first queue.

16. The non-transitory machine readable medium of claim 12, wherein the set of instructions for configuring the NIC to direct the data messages to the particular queue comprises a set of instructions for defining a filter for the DCN and configuring the NIC to apply the filter to the particular queue, wherein data messages received by the NIC match the filter based on at least one of an outer destination address, an inner destination address, and a network identifier.

17. The non-transitory machine readable medium of claim 12, wherein:

the second subset of queues are logical queues;

each logical queue in the second subset of queues is associated with a plurality of hardware queues; and the second feature balances data message traffic for a single DCN across multiple hardware queues.

18. The non-transitory machine readable medium of claim 12, wherein the program further comprises a set of instructions for defining a new subset of queues for a requested feature if there are no queues available for the requested feature, wherein queues in the new subset are reallocated from at least one existing subset of queues.

19. The non-transitory machine readable medium of claim 12, wherein the NIC implements the first feature for aggregating multiple related data messages received by the NIC into a single data message and the second feature for load balancing data messages received by the NIC across multiple queues of the associated subset of queues.

* * * * *